US012450477B2

(12) United States Patent
Li et al.

(10) Patent No.: US 12,450,477 B2
(45) Date of Patent: Oct. 21, 2025

(54) ADVERSARIAL INFORMATION BOTTLENECK STRATEGY FOR IMPROVED MACHINE LEARNING

(71) Applicant: Western Digital Technologies, Inc., San Jose, CA (US)

(72) Inventors: Qing Li, Milpitas, CA (US); Yongjune Kim, Daegu (KR); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 1095 days.

(21) Appl. No.: 17/409,667

(22) Filed: Aug. 23, 2021

(65) Prior Publication Data

US 2022/0138565 A1    May 5, 2022

Related U.S. Application Data

(60) Provisional application No. 63/107,044, filed on Oct. 29, 2020.

(51) Int. Cl.
    *G06N 3/08*    (2023.01)
    *G06N 3/04*    (2023.01)
(52) U.S. Cl.
    CPC .............. *G06N 3/08* (2013.01); *G06N 3/04* (2013.01)
(58) Field of Classification Search
    CPC .................................... G06N 3/08; G06N 3/04
    See application file for complete search history.

(56) References Cited

U.S. PATENT DOCUMENTS

2021/0152831 A1*  5/2021  Liu ..................... H04N 19/463
2022/0391709 A1* 12/2022  Aliper ..................... G06N 3/08

OTHER PUBLICATIONS

Boudiaf, Malik, et al. "A unifying mutual information view of metric learning: cross-entropy vs. pairwise losses." European conference on computer vision. Cham: Springer International Publishing, 2020. (Year: 2020).*
Alemi, Alexander A., et al. "Deep variational information bottleneck." arXiv preprint arXiv:1612.00410v7 (2019). (Year: 2019).*

* cited by examiner

*Primary Examiner* — Aleksandr Kerzhner
(74) *Attorney, Agent, or Firm* — Barry IP Law, P.C.

(57) ABSTRACT

Certain aspects of the present disclosure provide techniques for performing machine learning, including: processing a training data instance with a task model to generate an encoding and a task model output; processing a discriminator input based on the encoding using a discriminator model to generate an estimated mutual information between the encoding and the one or more input variables of the training data instance; updating parameters of the discriminator model using a first iterative optimization algorithm to maximize a discriminator objective function based on the estimated mutual information; and updating parameters of the task model using a second iterative optimization algorithm to minimize a task objective function based on a sum of the estimated mutual information between the task model output and the one or more input variables of the training data instance and a conditional entropy between the target variable and an encoding generated by the task model.

18 Claims, 4 Drawing Sheets

Algorithm 1 Training Algorithm for AIB

1: procedure AIB($\mathcal{T}, \beta$)
2:     $t \leftarrow 0$ and initialize $\omega$ and $\theta$ arbitrarily
3:     while not converged do
4:         Update $\omega$ by stochastic gradient descent of (6)
5:         Update $\theta$ by stochastic gradient descent of (7)
6:         $t \leftarrow t + 1$
7:     end while
8:     return $\omega$ and $\theta$
9: end procedure

FIG. 2

ADVERSARIAL INFORMATION BOTTLENECK STRATEGY FOR IMPROVED MACHINE LEARNING

CROSS-REFERENCE TO RELATED APPLICATIONS

This Application claims the benefit of and priority to U.S. Provisional Patent Application No. 63/107,044, filed on Oct. 29, 2020, the entire contents of which are incorporated herein by reference.

INTRODUCTION

The disclosure relates to machine learning, and in particular to adversarial information bottleneck strategies for improved machine learning.

Machine learning generally relates to a myriad of techniques for "training" machine learning models to perform useful tasks. For example, a machine learning model may be trained to recognize objects in an image or a video stream, or to predict the weather, or to help navigate an autonomous vehicle. A key aspect of making machine learning models useful is the ability to perform effective training of the models. However, machine learning model training has proven to be challenging in many regards, and is often a bottleneck between theoretical and real-world performance. Further, machine learning model training is time and computationally intensive, which makes it impractical to employ brute force approaches to finding optimal training techniques.

Accordingly, what are needed are improved techniques for training machine learning models so that such models may recognize their task potentials.

BRIEF SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a method of performing machine learning, comprising: processing a training data instance with a task model to generate an encoding and a task model output, wherein the training data instance comprises one or more input variables and at least one target variable; processing a discriminator input based on the encoding using a discriminator model to generate an estimated mutual information between the encoding and the one or more input variables of the training data instance; updating parameters of the discriminator model using a first iterative optimization algorithm to maximize a discriminator objective function based on the estimated mutual information; and updating parameters of the task model using a second iterative optimization algorithm to minimize a task objective function based on a sum of the estimated mutual information between the task model output and the one or more input variables of the training data instance and a conditional entropy between the target variable and an encoding generated by the task model.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

BRIEF DESCRIPTION OF THE DRAWINGS

The appended figures depict certain aspects of the one or more embodiments and are therefore not to be considered limiting of the scope of this disclosure.

FIG. 2 depicts an example training algorithm that can be used to implement an adversarial information bottleneck technique.

Figure 1A:
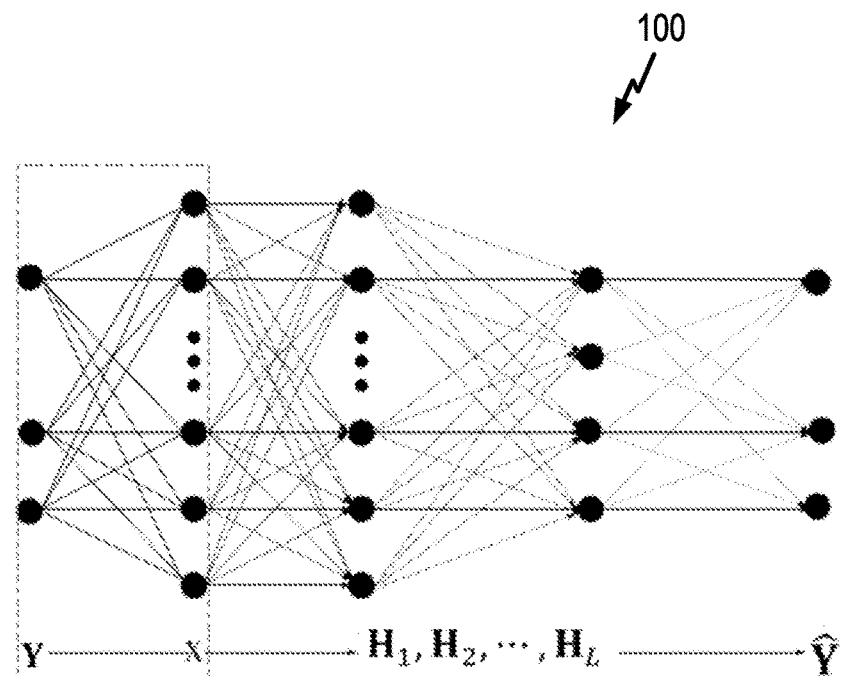
FIG. 1A depicts a general supervised learning setting.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

DETAILED DESCRIPTION

Information bottleneck (IB) is a promising theory for understanding and improving supervised machine learning. However, an obstacle preventing it from being widely used is computing mutual information, which underpins the IB theory. Embodiments described herein provide an efficient implementation of IB that leverages a generative adversarial approach, which may be referred to as an adversarial information bottleneck (AIB) technique. In particular, embodiments described herein implement a tractable variational lower bound for IB and use neural networks to estimate mutual information in order to maximize this lower bound.

Embodiments described herein implement an iterative training technique in which a discriminator model configured to estimate mutual information is optimized, and then used to optimize a task model configured to perform a useful task. Unlike conventional methods, mutual information is approximated in a tractable fashion by utilizing adversarial training methods. In particular, unlike conventional methods for estimating mutual information, the AIB techniques described herein can be used for training a wide-range of model architectures, including deterministic and stochastic machine learning models.

When used during training, the AIB techniques described herein beneficially boost performances of supervised models used for a wide range of tasks. For example, supervised models useful for computer vision (e.g., surveillance and image detection), natural language processing (e.g., for human interactive systems), and other regression and discrete/classification type models may all benefit from AIB-based training. Because the techniques described herein improve the performance of trained machine learning models, they may be used to train smaller, more efficient models, which can beneficially be implemented on a wider variety of devices, including mobile devices, internet of things (IoT) devices, and other power-constrained devices.

Introduction to Information Bottleneck and Mutual Information

Information bottleneck (IB) provides a novel information theoretic principle governing performances of supervised learning models. Generally speaking, IB postulates that optimal deep neural network (DNN) model performance is attained in a model in which each layer simultaneously attempts to maximize its mutual information (MI) with the target space (e.g., an output classification) while minimizing its MI with the input space. The logic is that the DNN layers should successively compress the latent representations so as to allow for good generalization, while retaining only the information essential for target prediction. Specifically, it has been described that each DNN layer should maximize the IB Lagrangian according to: $\mathcal{L}_{IB} = I(Y; L_i) - \beta I(X; L_i)$, where I denotes mutual information, X and Y are the input and target variables, $L_i$ is the latent representation at the ith hidden layer, and $\beta$ is a trade-off parameter. Experiments have validated IB as a theory and suggest applying IB as a general rule to train any supervised model, including, for example, DNNs.

One obstacle preventing IB from being widely used is computing mutual information, which is generally intractable because there is generally not access to the underlying distributions of the high-dimensional input data used during training. Initial approaches to IB have thus used closed-form formulas for solutions and an iterative algorithm similar to the Blahut Arimoto algorithm. However, these conventional approaches are infeasible to apply to general DNNs because a closed-form of Kullback Leibler (KL) divergence is needed, which is challenging to obtain—especially for high-dimensional data. Previous IB approaches were thus focused on data comprising a small number of discrete states, or based on the assumption of a Gaussian distribution for network parameters, for which KL divergence can be efficiently calculated. Other approaches include a form of information dropout to approximate IB, a variational approximation to IB, which is based on the assumption that hidden neurons follow Gaussian distributions, and which uses the reparameterization trick along with an approximate variational scheme for maximizing a lower bound of IB.

However, none of the aforementioned approaches is applicable to general supervised models. For example, the Gaussian assumptions and simplifications made in some previous approaches limit their applicability to certain supervised models, such as stochastic models. Further, certain aforementioned approaches require a layer-by-layer training regime instead of the preferable and widely used end-to-end training regime.

Embodiments described herein are distinct from and improve upon previous approaches in that they implement a tractable variational lower bound for IB and use a discriminator model (e.g., a neural network) to maximize the variational lower bound for IB. AIB embodiments described herein are thus applicable to a wide range of supervised models, and do not have any of the limitations of the aforementioned approaches.

Adversarial Learning

Generative adversarial networks (GAN) is a framework of generative models using a two-player minimax game, which is applicable to other areas, e.g., information retrieval, molecular design, computer vision, and so on. Embodiments described herein take inspiration from GAN to approximate mutual information and introduce adversarial learning in IB, which beneficially forces models to retain succinct information about input data.

One challenge with a GAN is the instability of its training. One technique for overcoming this instability is training the GAN with multiple discriminators, the results of which may be aggregated (e.g., using max, average, or weighted average). Another technique is using spectral normalization to stabilize the training of a discriminator. Each of these techniques may be implemented with the AIB embodiments described herein.

Adversarial Information Bottleneck

In the following description, the following notations are used. X generally refers to input data, e.g., a low level representation of the data, such as pixels of an image or spectral information for a sound file, etc. Y generally refers to labels for X, e.g., categories or discrete values of X. $H_L$ generally refers to hidden variables (e.g., parameters within a neural network model). $\hat{Y}$ generally refers to predicted output by a model (e.g., neural network) for a given input X. W generally refers to weights (e.g., weight tensors for a neural network model). Finally, P(X) denotes a probability distribution of X.

Consider the general supervised learning setting 100 shown in FIG. 1A. During training both input X and desired output Y are available, and are used to learn the weight matrices between hidden layers $H_l$. During testing, the network receives input X, and successively processes it through the layers $H_l$, $l \in 1 \ldots L$, which form a Markov chain (denoted by → in FIG. 1A), and produces output $\hat{Y}$. The model infers hidden variables $H_l$ for l=1,2, ..., L from X, and generates a predicted output $\hat{Y}$ based on $H_L$.

Let $H_0$=X and $W_l$ denote the weight matrices between $H_{l-1}$ and $H_l$. The parameters are denoted as $\theta = \{W_l\}$, and $H = (H_1, H_2, \ldots, H_L, \hat{Y})$, i.e., the concatenation of all hidden layers $H_1, H_2, \ldots, H_L$ and predicted output $\hat{Y}$.

As shown in FIG. 1A, given training data $\mathcal{T} = \{(X_1, Y_1), (X_2, Y_2), \ldots, (X_T, Y_T)\}$, where T denotes the number of training pairs, the neural network model 100 is trained to learn in a maximally informative way about target Y, measured by the mutual information between encoding H and target Y, which may be denoted as I(H; Y).

IB adds another constraint on the mutual information between encoding H and original data X, thus the target function is to minimize the following IB-Lagrangian:

$$\mathcal{L}_{(P_\theta(H|XY))} = I(H; B) - \beta I(H; Y). \quad (1)$$

That is, the target function of Equation (1) causes the model to learn an encoding H that is maximally expressive about Y (i.e., maximizing I(H; Y)) while being maximally compressive about X (i.e., minimizing I(H; X)), where $\beta \geq 0$ controls the trade-off between the two competing targets (expressivity and compression).

Theoretically, for a large β, an optimal θ achieving IB-Lagrangian indicates that the model is less compressible, more expressive, and generally has higher test accuracies. On the other hand, a small β indicates that a model is more compressible, less expressive, and generally has lower test accuracies.

Alternatively, the target function may be considered as:

$$\mathcal{L}(P_\theta(H|XY))=I(H;X)-\beta(H(Y)-H(Y|H)),$$

where the entropy H(Y) is constant for given training data; thus, minimizing $\mathcal{L}(P_\theta(H|XY))$ is equivalent to minimizing:

$$\mathcal{L}'(P_\theta(H|XY))=\beta H(Y|H)+I(H;X). \quad (2)$$

In Equation (2), the conditional entropy H(Y|H) can be approximated by the cross-entropy between Y and H (or further the cross-entropy between Y and Ŷ), which conveniently is the most popular loss function in supervised models. However, the challenge is that computing the mutual information between training data and encoded data (i.e., I(H; X)) is intractable with conventional methods.

The following may be considered the lower bound on I(H; X):

$$I(H;X) \geq \sup_{F \in \mathcal{F}} \mathbb{E}_{X,H \sim P(X,H)} F(X,H) - \mathbb{E}_{X,H \sim P(X)P(H)} \exp(F(H,H)-1), \quad (3)$$

where $\mathcal{F}$ is an arbitrary class of functions F:X, H→ℝ⁺.

Then, based on Equations (3) and (2), the following is lower bounded as follows:

$$\mathcal{L}'(P_\theta(H|XY)) \geq \sup_{F \in \mathcal{F}} \mathbb{E}_{X,H \sim P(X,H)} F(X,H) - \quad (4)$$

$$\mathbb{E}_{X,H \sim P(X)P(H)} \exp(F(X,H)-1) + \beta H(Y|H).$$

The objective function may then be transformed to:

$$\min_\theta \max_F \mathbb{E}_{X,H \sim P(X,H)} F(X,H) - \quad (5)$$

$$\mathbb{E}_{X,H \sim P(X)P(H)} \exp(F(X,H)-1) + \beta H(Y|H),$$

where min over θ is due to the IB definition, e.g., per Equation (2), and max over F is to maximize the derived lower bound, e.g., per Equation (4).

As deep neural networks are universal approximators, an adversarial neural network may be implemented as a discriminative network ω to parameterize F. More specifically, max over F can be achieved by the following objective for ω given a fixed θ:

$$\max_\omega \mathbb{E}_{X,H \sim P(X,H)} F(X,H) - \mathbb{E}_{X,H \sim P(X)P(H)} \exp(F(X,H)-1). \quad (6)$$

Intuitively, F(X, H) tries to distinguish pairs (X, H) sampled from P(X)P(H) and pairs (X, H) sampled from the encoding process P(X, H).

Similarly, for a fixed ω, the objective for θ is:

$$\min_\theta \mathbb{E}_{X,H \sim P(X,H)} F(X,H) + \beta H(Y|H), \quad (7)$$

where in the above $\mathbb{E}_{X,H \sim P(X)P(H)}\exp(F(X,H)-1)$ is skipped for optimization, which may be done because θ is not involved if X and H are independent, i.e., X, H∼P(X)P(H).

In this context, adversary may refer to any discriminative network estimating I(H; X), i.e., KL-divergence between P(X, H) and P(X)P(H).

AIB Training Algorithm

Figure 1B:
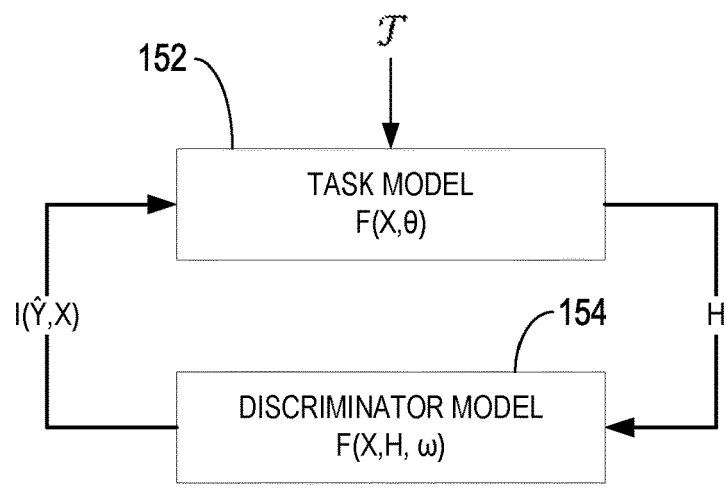
FIG. 1B depicts an example of an adversarial information bottleneck training setting.

AIB shares characteristics with GAN in that a task model F(X) (e.g., an encoder) parameterized by θ and a discriminator model F(X, H) parameterized by ω of an AIB form a two-player minimax game with an objective as in Equation (5). As shown in FIG. 1B: the parameters ω of descriminator model 154 are trained to maximize Equation (6), and simultaneously the parameters θ of task model 152 are trained to minimize Equation (7).

In one embodiment, the training algorithm 200 in FIG. 2 can be used to implement the AIB technique, where $\omega^t$ and $\theta^t$ denote the parameters of the discriminator model and the task model, respectively, obtained at the $t^{th}$ training iteration, $\mathcal{T}$ is the training data set (e.g., $\{(X_1, Y_1), (X_2, Y_2), \ldots, (X_T, Y_T)\}$), and β is the tradeoff hyperparameter (as discussed above). As shown in algorithm 200 of FIG. 2, each training epoch occurs in two phases: training the discriminator model (as shown in line 4 of algorithm 200), and then training the task model (as shown in line 5 of algorithm 200).

In some embodiments, an optimal discriminator F*(X, H) may be considered according to the following:

$$F^* \stackrel{def}{=} \arg\max_F \mathbb{E}_{X,H \sim P(X,H)} F(X,H - \mathbb{E}_{X,H \sim P(X)P(H)} \exp(F(X,H)-1).$$

Let P*(H|X) be the conditional distribution minimizing $\mathcal{L}'(P(H|XY))$, i.e., $P^*(H|X)=\arg\min_{P(H|X)} \mathcal{L}'(P(H|XY))$, and let P*(H) be the resulting marginal distribution.

Assume θ has enough capacity and P*(H|X) can be represented by θ. The optimal discriminator F* according to Equation (6) is given by:

$$F^*(X,H)=1-\beta D_{KL}(P(Y|X)\|P(Y|H))-\log Z_\beta(X), \quad (8)$$

where $Z_\beta(X) \stackrel{def}{=} \Sigma_H P^*(H)\exp(-\beta D_{KL}(P(Y|X)\|P(Y|H)))$.

Equation (8) suggests that given X and hidden variables H, F*(X, H) estimates how well H represents X by returning $1-\beta D_{KL}(P(Y|H)\|P(Y|H))-\log Z_\beta(X)$; that is, the more similar P(Y|H) is to P(Y|X), the better H is a representation of X.

As above, the hyperparameter β controls a tradeoff during training and affects the characteristics of AIB. Experiments show that when β is relatively small, e.g., $10^{-3}$, the training and test accuracies may be likewise small, thus representing random guesses. Training and test accuracies improve with moderate β's, e.g., $[1-10^2]$. This is consistent with that fact that β controls the trade-off between model expressiveness and compressiveness, as described above. Moreover, there may be a clear phase transition where the accuracy sharply increases for some value range of β (e.g., β=2 to β=3 in certain experiments), which supports the theoretical study of phase transition of IB. For large enough β, e.g., $10^{28}$, training and testing accuracy of the AIB-B variant (described further below) approaches conventional performance of conventional training techniques, e.g., techniques without AIB. This is because a conventional training objective is Equation (2) with β=+∞.

Generally, with a proper β value, e.g., $10^{10}$ in certain examples, training and testing accuracy of AIB outperforms conventional training techniques. Further, experiments show that AIB helps to prevent overfitting noise that occurs in conventional training methods. That is, compared to AIB, conventional training methods tend to overfit the detail and noise in the training data. AIB shows that lossy compression is helpful to remove noise, because a reasonable compression methods retains the dominant signal features more than the randomness of the noise. Thus, AIB beneficially achieves the trade-off between model expressiveness and compressiveness and can be used to remove noise.

Discriminator Designs for AIB

Equation (8) predicts the optimal discriminator output; however, it does not describe how to design discriminators efficiently. Thus, two exemplary discriminator designs are described in-turn, which beneficially integrate with general supervised models efficiently.

As $H=(H_1, H_2, \ldots, H_L, \hat{Y})$, conventional approaches have optimized in a layer-by-layer sequential manner, i.e., optimizing $I(H_{i-1}; H_i)+\beta H(Y|H_{i-1}, H_i)$ sequentially for $i=1,2,\ldots, L+1$, where $H_0=X$, and $H_{L+1}=\hat{Y}$. However, this serial approach has two disadvantages: first, it is computationally intensive as it requires L+1 discriminators; and second, optimizing $I(H_{i-1}; H_i)+\beta H(Y|H_{i-1}, H_i)$ for each layer is contrary to predominant end-to-end supervised model training flows. Therefore, the layer-serial scheme described above is costly from a time and computation standpoint.

In one embodiment, referred to as AIB-A, encoding H may be replaced by $\hat{Y}$, which means Equation (2) becomes $I(\hat{Y}; X)+\beta H(Y|\hat{Y})$, where $H(Y|\hat{Y})$ can be approximated by the cross-entropy between Y and $\hat{Y}$. Thus, the input to the AIB-A discriminator is $\hat{Y}$ and Y, where $\hat{Y}$ corresponds to the final predicted result of input X. With this, it is possible to integrate AIB into a supervised model at the cost of a discriminator. However, based on the chain rule of information, $I(X; H)=I(X; \hat{Y})+I(X; (H_1, H_2, \ldots, H_L)|\hat{Y})$, and thus the focus of AIB-A is on $I(X; \hat{Y})$ and $I(X; (H_1, H_2, \ldots, H_L)|\hat{Y})$ is not necessarily minimized.

Beneficially, AIB-A embodiments reduce complexity compared to conventional approaches because the same discriminator can be used for all supervised models with the same dimensionality of prediction output. Further, experimental results show AIB-A boosts trained model performances compared to conventionally trained models.

In another embodiment, referred to as AIB-B, H is replaced by $(H_L, \hat{Y})$, i.e., the concatenation of the last layer $\hat{Y}$ and the second to last layer $H_L$ (as in FIG. 1A), which means Equation (2) becomes $I(H_L, \hat{Y}; X)+\beta H(Y|H_L, \hat{Y})$. Based on the chain rule of information, $I(\hat{Y}; X)+I(H_L; X|\hat{Y})+\beta H(Y|H_L, \hat{Y})$ is upper bounded by $I(\hat{Y}; X)+I(H_L; X)+\beta H(Y|H_L, \hat{Y})$ as X, $H_L$ and $\hat{Y}$ form a Markov chain (as in FIG. 1A), and further upper bounded by $I(\hat{Y}; X)+I(H_L; X)+\beta H(Y|\hat{Y})$. Thus, the input to the AIB-B discriminator for $I(H_L; X)$ is $(H_L, \hat{Y})$ or $(\hat{H}_L, \hat{Y})$, where $H_L$ and $\hat{Y}$ correspond to the hidden layer result of the $L^{th}$ layer and the final predicted result of input X, and $\hat{H}_L$ corresponds to the hidden layer result of the $L^{th}$ layer with another input $X_1$. $H_L$ is fed into the convolutional network of AIB-B, giving the result as $Y(H_L)$, and the output of AIB-B is the mean squared error (MSE) difference between $Y(H_L)$ and $\hat{Y}$.

AIB-B is more complicated than AIB-A in that it needs two discriminators to estimate $I(H_L; X)$ and $I(\hat{Y}; X)$; $H_L$, and thus its discriminator for $I(H_L; X)$ depends on the given task model. However, AIB-B beneficially optimizes the discriminator for $H_L$ in addition to $\hat{Y}$ (which keeps more information about X), and experimental results show that AIB-B may provide even better results than the already improved AIB-A results in certain circumstances.

Note that while the description above considers all L layers of a model, it is possible to generalize the above techniques to consider a subset of layers of a task model, such as the last l layers of the task model with the cost of l discriminators.

Example Method for Performing AIB Training

Figure 3:
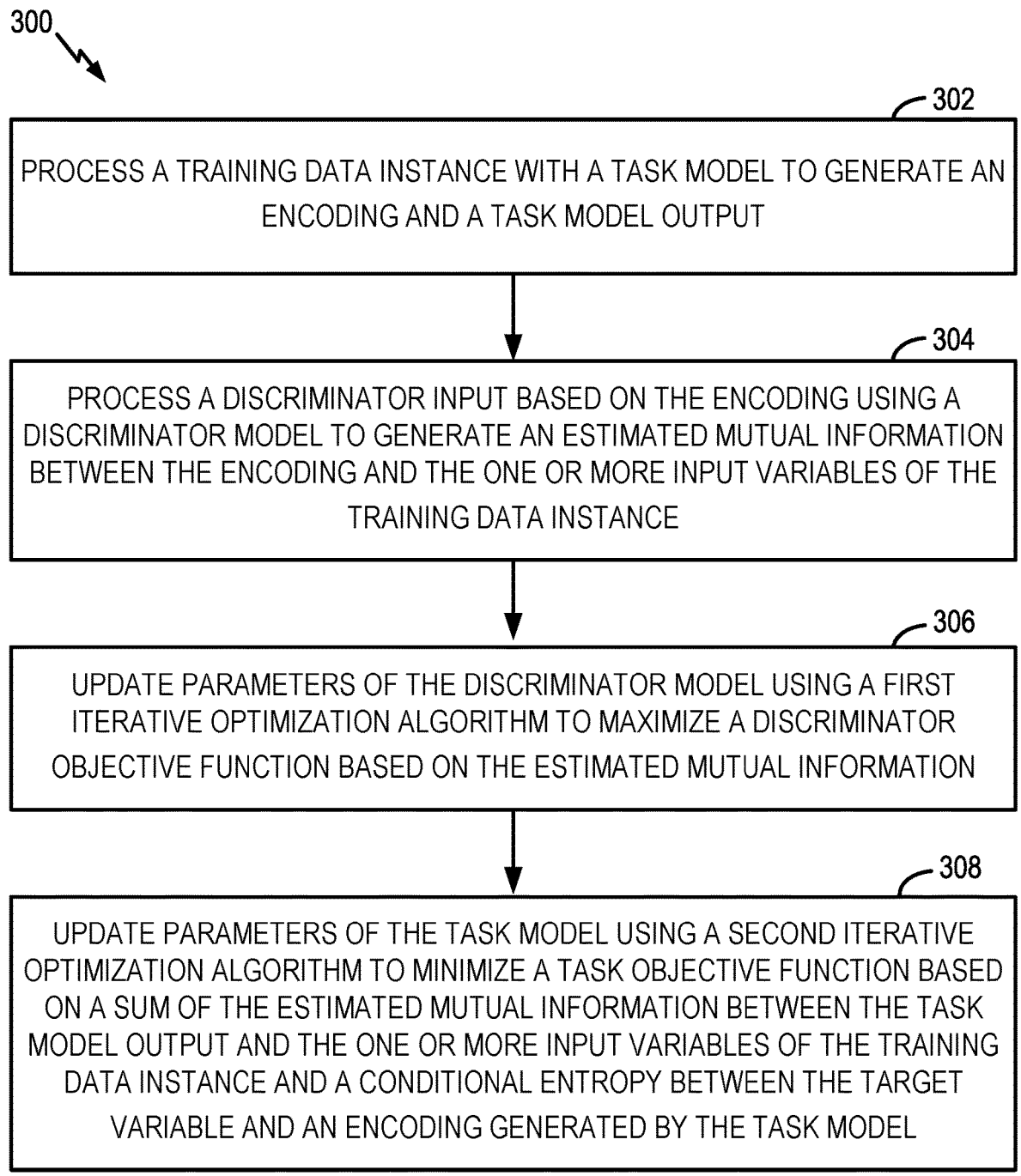
FIG. 3 depicts an example method of training a task model using an adversarial information bottleneck technique.

FIG. 3 depicts an example method 300 of performing machine learning according to aspects described herein. For example, method 300 is one method for implementing the training algorithm 200 of FIG. 2.

Method 300 begins at step 302 with processing a training data instance (e.g., X) with a task model to generate an encoding (e.g., H) and a task model output (e.g., $\hat{Y}$), wherein the training data instance comprises one or more input variables and at least one target variable (e.g., Y).

Method 300 then proceeds to step 304 with processing a discriminator input based on the encoding using a discriminator model to generate an estimated mutual information between the encoding and the one or more input variables of the training data instance (e.g., I(H; X)).

Method 300 then proceeds to step 306 with updating parameters of the discriminator model (e.g., $\omega$) using a first iterative optimization algorithm to maximize a discriminator objective function (e.g., max I(H; X)) based on the estimated mutual information.

Method 300 then proceeds to step 308 with updating parameters of the task model (e.g., $\theta$) using a second iterative optimization algorithm to minimize a task objective function based on a sum of the estimated mutual information between the task model output and the one or more input variables of the training data instance and a conditional entropy between the target variable and an encoding generated by the task model (e.g., $I(H; X)+\beta H(Y|H)$).

In some embodiments method 300 further includes estimating the conditional entropy between the target variable and the encoding generated by the task model based on a cross-entropy between the task model output and the target variable (e.g., $H(Y|\hat{Y})$).

In some embodiments, the discriminator input comprises the task model output (e.g., $\hat{Y}$) and the target variable (e.g., Y).

The method of claim 3, wherein the task objective function comprises a hyperparameter (e.g., $\beta$) configured to control a tradeoff between the estimated mutual information and a cross-entropy between the task model output and the target variable.

In some embodiments method 300 further includes determining a weighted sum of the conditional entropy between the target variable and the encoding generated by the task model based on a cross-entropy between the task model output and a concatenation of the task model output and output from a second to last layer of the task model and the estimated mutual information between the encoding and the one or more input variables of the training data instance, for example, as discussed above with respect to AIB-B embodiments.

The method of claim 5, wherein the discriminator input comprises the task model output (e.g., $\hat{Y}$) and a hidden layer result for a final hidden layer of the task model (e.g., $H_L$).

In some embodiments of method 300, the first and/or second iterative optimization algorithm comprises gradient descent.

In some embodiments method 300 further includes deploying the task model with updated parameters. For example, the task model could be deployed to a processing device, such as a computer, server, a mobile processing device (e.g., smartphone or smart wearable device), an internet of things (IoT) device, and the like.

Example Processing Device

Figure 4:
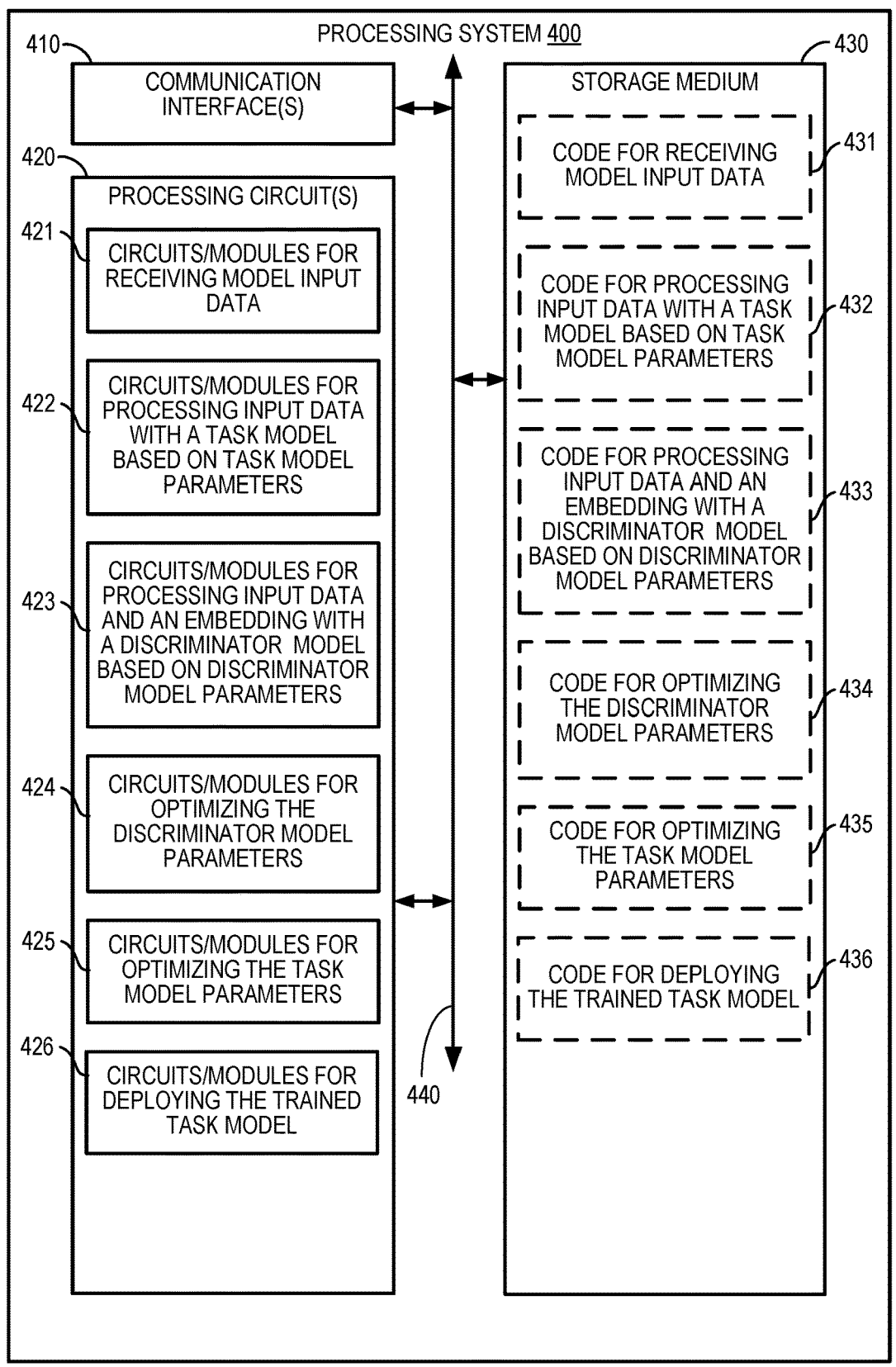
FIG. 4 depicts an example processing apparatus configured to perform the methods described herein.

FIG. 4 depicts an example processing system 400, which may be configured to perform the various aspects described herein, including the methods described with respect to FIGS. 2 and 3.

Processing system 400, or components thereof, could embody or be implemented within a server computer, desktop computer, workstation, tablet computer, smartphone, smart wearable device, internet of things (IoT) device, edge processing device, personal digital assistant, digital camera, digital phone, entertainment device, medical device, self-driving vehicle control device, data storage device, controller device, host device, or some other type of device that processes data.

Processing system 400 includes a communication interface(s) 410, processing circuit(s) 420 (e.g., at least one processor and/or other suitable circuitry), and storage medium 430 (e.g., a non-volatile memory). These components can be coupled to and/or placed in electrical communication with one another via a signaling bus 440 or other suitable component, represented generally by the connection lines in FIG. 4. The signaling bus 440 may include any number of interconnecting buses and bridges depending on the specific application of the processing circuit(s) 420 and the overall design constraints. The signaling bus 440 links together various elements such that each of the communication interface 410, the processing circuit(s) 420, and the storage medium 430 are coupled to and/or in electrical communication with each other. The signaling bus 440 may also link various other circuits (not shown) such as timing sources, peripherals, voltage regulators, and power management circuits, which are well known in the art, and therefore, will not be described any further.

The communication interface 410 provides a means for communicating with other devices or apparatuses over a transmission medium. In some implementations, the communication interface 410 includes circuitry and/or programming (e.g., a program) adapted to facilitate the communication of information bi-directionally with respect to one or more devices in a system. In some implementations, the communication interface 410 may be configured for wire-based communication. For example, the communication interface 410 could be a bus interface, a send/receive interface, or some other type of signal interface including drivers, buffers, or other circuitry for outputting and/or obtaining signals (e.g., outputting signal from and/or receiving signals into an integrated circuit). The communication interface 410 serves as one example of a means for receiving and/or a means for transmitting.

The storage medium 430 may represent one or more computer-readable, machine-readable, and/or processor-readable devices for storing programming, such as processor executable code or instructions (e.g., software, firmware), electronic data, databases, or other digital information. The storage medium 430 may also be used for storing data that is manipulated by the processing circuit(s) 420 when executing programming. The storage medium 430 may be any available media that can be accessed by a general purpose or special purpose processor, including portable or fixed storage devices, optical storage devices, and various other mediums capable of storing, containing or carrying programming.

By way of example and not limitation, the storage medium 430 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 430 may be embodied in an article of manufacture (e.g., a computer program product). By way of example, a computer program product may include a computer-readable medium in packaging materials. In view of the above, in some implementations, the storage medium 430 may be a non-transitory (e.g., tangible) storage medium. For example, the storage medium 430 may be a non-transitory computer-readable medium storing computer-executable code, including code to perform operations as described herein.

The storage medium 430 may be coupled to the processing circuit(s) 420 so that the processing circuit 420 can read information from, and write information to, the storage medium 430. That is, the storage medium 430 can be coupled to the processing circuit(s) 420 so that the storage medium 430 is at least accessible by the processing circuit(s) 420, including examples where at least one storage medium is integral to the processing circuit(s) 420 and/or examples where at least one storage medium is separate from the processing circuit(s) 420 (e.g., resident in the apparatus 400, external to the apparatus 400, distributed across multiple entities, etc.).

Programming stored by the storage medium 430, when executed by the processing circuit(s) 420, causes the processing circuit(s) 420 to perform one or more of the various functions and/or process operations described herein. For example, the storage medium 430 may include operations configured for regulating operations at one or more hardware blocks of the processing circuit(s) 420, as well as to utilize the communication interface(s) 410 for wireless communication utilizing their respective communication protocols.

At least some of the processing circuits described herein are generally adapted for processing, including the execution of such programming stored on a storage medium such as storage medium 430. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein are arranged to obtain, process and/or send data, control data access and storage, issue commands, and control other desired operations. For example, the processing circuits may include circuitry configured to implement desired programming provided by appropriate media in at least one example.

For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuits may also be implemented as a combination of computing components, such as a combination of a controller and a microprocessor, a number of microprocessors, one or more microprocessors in conjunction with an ASIC and a microprocessor, or any other number of varying configurations. These examples of processing circuits are for illustration and other suitable configurations within the scope of the disclosure are also contemplated.

According to one or more aspects of the disclosure, the processing circuit(s) 420 may be adapted to perform any or all of the features, processes, functions, operations and/or routines for any or all of the methods described herein. For example, the processing circuit(s) 420 may be configured to perform any of the steps, functions, and/or processes described with respect to FIGS. 2-3. As used herein, the term "adapted" in relation to the processing circuit(s) 420 may refer to the processing circuit(s) 420 being one or more of configured, employed, implemented, and/or programmed to perform a particular process, function, operation and/or routine according to various features described herein. The processing circuit(s) 420 may be a specialized processor, such as an ASIC that serves as a means for (e.g., structure for) carrying out any one of the operations described in conjunction with FIGS. 2-3. The processing circuit(s) 420 serves as one example of a means for processing.

According to at least one example of the apparatus 400, the processing circuit(s) 420 may include one or more of: a circuit/module 421 for receiving machine learning model input data; a circuit/module 422 for processing the machine learning model input data with a machine learning model, such as a task model based on a set of task model parameters; a circuit/module 423 for processing the machine learning model input data and an embedding in another machine learning model, such as a discriminator model based on a set of discriminator model parameters; a circuit/module 424 for optimizing the discriminator model parameters; a circuit/module 425 for optimizing the task model; and a circuit/module 426 for deploying the trained task model. Notably, these are just some examples, and others are possible based on the various aspects described herein.

As mentioned above, a program stored by the storage medium 430, when executed by the processing circuit(s) 420, causes the processing circuit(s) 420 to perform one or more of the various functions and/or process operations described herein. For example, the program may cause the processing circuit(s) 420 to perform and/or control the various functions, steps, and/or processes described herein with respect to FIGS. 2-3.

As shown in FIG. 4, the storage medium 430 may include one or more of: code 431 for receiving machine learning model input data; code 432 for processing the machine learning model input data with a machine learning model, such as a task model based on a set of task model parameters; code 433 for processing the machine learning model input data and an embedding in another machine learning model, such as a discriminator model based on a set of discriminator model parameters; code 434 for optimizing the discriminator model parameters; code 435 for optimizing the task model; and code 436 for deploying the trained task model. Notably, these are just some examples, and others are possible based on the various aspects described herein.

In at least some examples, the various circuits/modules in 420 as well as other processing elements described herein may comprise means for performing the various functions described herein, including the functions enabled by the various codes stored in storage medium 430.

Example Clauses

Implementation examples are described in the following numbered clauses:

Clause 1: A method of performing machine learning, comprising: processing a training data instance with a task model to generate an encoding and a task model output, wherein the training data instance comprises one or more input variables and at least one target variable; processing a discriminator input based on the encoding using a discriminator model to generate an estimated mutual information between the encoding and the one or more input variables of the training data instance; updating parameters of the discriminator model using a first iterative optimization algorithm to maximize a discriminator objective function based on the estimated mutual information; and updating parameters of the task model using a second iterative optimization algorithm to minimize a task objective function based on a sum of the estimated mutual information between the task model output and the one or more input variables of the training data instance and a conditional entropy between the target variable and an encoding generated by the task model.

Clause 2: The method of Clause 1, wherein the discriminator input comprises the task model output and the target variable.

Clause 3: The method of Clause 2, wherein the task objective function comprises a hyperparameter configured to control a tradeoff between the estimated mutual information and a cross-entropy between the task model output and the target variable.

Clause 4: The method of any one of Clauses 1-3, further comprising determining a weighted sum of the conditional entropy between the target variable and the encoding generated by the task model based on a cross-entropy between the task model output and a concatenation of the task model output and output from a second to last layer of the task model and the estimated mutual information between the encoding and the one or more input variables of the training data instance.

Clause 5: The method of Clause 4, wherein the discriminator input comprises the task model output and a hidden layer result for a final hidden layer of the task model.

Clause 6: The method of any one of Clauses 1-5, wherein the first and/or the second iterative optimization algorithm comprises gradient descent.

Clause 7: The method of any one of Clauses 1-6, further comprising deploying the task model with updated parameters.

Clause 8: A method for inferencing with a machine learning model, comprising processing input date with a task model trained according to any one of Clauses 1-7.

Clause 9: A processing system, comprising: a memory comprising computer-executable instructions; and one or more processors configured to execute the computer-executable instructions and cause the processing system to perform a method in accordance with any one of Clauses 1-8.

Clause 10: A processing system, comprising means for performing a method in accordance with any one of Clauses 1-8.

Clause 11: A non-transitory computer-readable medium comprising computer-executable instructions that, when executed by one or more processors of a processing system, cause the processing system to perform a method in accordance with any one of Clauses 1-8.

Clause 12: A computer program product embodied on a computer-readable storage medium comprising code for performing a method in accordance with any one of Clauses 1-8.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration. The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, and C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "one or more of: A, B, or C" is intended to cover A, B, C, A-B, A-C, B-C, and A-B-C, as well as multiples of the same members (e.g., any lists that include AA, BB, or CC). Likewise, "one or more of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A method of performing machine learning, comprising:
    processing a training data instance with a task model, wherein the task model is configured to generate an encoding and a task model output based on parameters of the task model, wherein the training data instance comprises one or more input variables and at least one target variable;
    processing a discriminator input based on the encoding using a discriminator model, wherein the discriminator model is configured to generate an estimated mutual information between the encoding and the one or more input variables of the training data instance based on parameters of the discriminator model;
    updating parameters of the discriminator model using a first iterative optimization algorithm to maximize a discriminator objective function based on the estimated mutual information;

updating parameters of the task model using a second iterative optimization algorithm to minimize a task objective function based on a sum of the estimated mutual information between the task model output and the one or more input variables of the training data instance and a conditional entropy between the target variable and an encoding generated by the task model; and determining a weighted sum of the conditional entropy between the target variable and the encoding generated by the task model based on a cross-entropy between the task model output and a concatenation of the task model output and output from a second to last layer of the task model and the estimated mutual information between the encoding and the one or more input variables of the training data instance.

2. The method of claim 1, wherein the discriminator input comprises the task model output and the target variable.

3. The method of claim 2, wherein the task objective function comprises a hyperparameter configured to control a tradeoff between the estimated mutual information and a cross-entropy between the task model output and the target variable.

4. The method of claim 1, wherein the discriminator input comprises the task model output and a hidden layer result for a final hidden layer of the task model.

5. The method of claim 1, wherein the second iterative optimization algorithm comprises gradient descent.

6. The method of claim 1, further comprising deploying the task model with updated parameters.

7. A processing system, comprising:
a memory comprising computer-executable instructions; and
one or more processors configured, individually or in combination, to execute the computer-executable instructions and cause the processing system to:
process a training data instance with a task model, wherein the task model is configured to generate an encoding and a task model output based on parameters of the task model, wherein the training data instance comprises one or more input variables and at least one target variable;
process a discriminator input based on the encoding using a discriminator model, wherein the discriminator model is configured to generate an estimated mutual information between the encoding and the one or more input variables of the training data instance based on parameters of the discriminator model;
update parameters of the discriminator model using a first iterative optimization algorithm to maximize a discriminator objective function based on the estimated mutual information;
update parameters of the task model using a second iterative optimization algorithm to minimize a task objective function based on a sum of the estimated mutual information between the task model output and the one or more input variables of the training data instance and a conditional entropy between the target variable and an encoding generated by the task model; and
cause the system to determine a weighted sum of the conditional entropy between the target variable and the encoding generated by the task model based on a cross-entropy between the task model output and a concatenation of the task model output and output from a second to last layer of the task model and the estimated mutual information between the encoding and the one or more input variables of the training data instance.

8. The processing system of claim 7, wherein the discriminator input comprises the task model output and the target variable.

9. The processing system of claim 8, wherein the task objective function comprises a hyperparameter configured to control a tradeoff between the estimated mutual information and a cross-entropy between the task model output and the target variable.

10. The processing system of Claim 7, wherein the discriminator input comprises the task model output and a hidden layer result for a final hidden layer of the task model.

11. The processing system of claim 7, wherein the second iterative optimization algorithm comprises gradient descent.

12. The processing system of claim 7, wherein the one or more processors are further configured, individually or in combination, to cause the system to deploy the task model with updated parameters.

13. A non-transitory computer-readable medium comprising computer-executable instructions that, when executed by one or more processors of a processing system, individually or in combination, cause the processing system to perform a method, the method comprising:
processing a training data instance with a task model, wherein the task model is configured to generate an encoding and a task model output based on parameters of the task model, wherein the training data instance comprises one or more input variables and at least one target variable;
processing a discriminator input based on the encoding using a discriminator model, wherein the discriminator model is configured to generate an estimated mutual information between the encoding and the one or more input variables of the training data instance based on parameters of the discriminator model;
updating parameters of the discriminator model using a first iterative optimization algorithm to maximize a discriminator objective function based on the estimated mutual information;
updating parameters of the task model using a second iterative optimization algorithm to minimize a task objective function based on a sum of the estimated mutual information between the task model output and the one or more input variables of the training data instance and a conditional entropy between the target variable and an encoding generated by the task model; and
determining a weighted sum of the conditional entropy between the target variable and the encoding generated by the task model based on a cross-entropy between the task model output and a concatenation of the task model output and output from a second to last layer of the task model and the estimated mutual information between the encoding and the one or more input variables of the training data instance.

14. The non-transitory computer-readable medium of claim 13, wherein the discriminator input comprises the task model output and the target variable.

15. The non-transitory computer-readable medium of claim 14, wherein the task objective function comprises a hyperparameter configured to control a tradeoff between the estimated mutual information and a cross-entropy between the task model output and the target variable.

16. The non-transitory computer-readable medium of claim 13, wherein the discriminator input comprises the task model output and a hidden layer result for a final hidden layer of the task model.

17. The non-transitory computer-readable medium of claim 13, wherein the second iterative optimization algorithm comprises gradient descent.

18. The non-transitory computer-readable medium of claim 13, wherein the processing system further comprises means for deploying the task model with updated parameters to a processing device.

* * * * *